Jan. 19, 1971     D. R. STEWART ET AL     3,555,742

PART SIZING GRINDING MACHINE CONTROL SYSTEM

Original Filed April 26, 1966     4 Sheets-Sheet 1

INVENTOR.
DONALD R. STEWART
BY    ELLIS D. KANE

ATTORNEY.

INVENTOR.
DONALD R. STEWART
BY ELLIS D. KANE

ATTORNEY.

INVENTOR.
DONALD R. STEWART
ELLIS D. KANE
BY
ATTORNEY.

United States Patent Office 3,555,742
Patented Jan. 19, 1971

3,555,742
PART SIZING GRINDING MACHINE CONTROL SYSTEM
Donald R. Stewart and Ellis D. Kane, Detroit, Mich.; said Kane assignor to said Stewart, Detroit, Mich., doing business as Stewart Instrument Company, Detroit, Mich.
Original application Apr. 26, 1966, Ser. No. 545,363, now Patent No. 3,517,460, dated June 30, 1970. Divided and this application Jan. 31, 1969, Ser. No. 795,522
Int. Cl. B24b 49/00
U.S. Cl. 51—165
6 Claims

ABSTRACT OF THE DISCLOSURE

The disclosure is a grinding machine control system including a grinding wheel which is movably advanced toward a workpiece during a grinding operation by operation of an electric motor. The object is to automatically stop the advance of the grinding wheel so as to grind a workpiece to a predetermined desired size. To this end a settable stop member is provided and is movable by the motor which is in turn controlled by a control system which responds to wear of both the wheel and the workpiece.

---

This application is a division of our pending application entitled Abrading Tool Control System, Ser. No. 545,363, filed Apr. 26, 1966, now Pat. No. 3,517,460, dated June 30, 1970.

SUMMARY OF THE INVENTION

The invention resides in the provision of a workpiece sizing control system having a control element responsive to wear of a grinding wheel and the wearing of the workpiece to set a movable stop member.

It is the principal object of the invention to provide for a grinding machine having a grinding wheel which is advanced against a workpiece, a control system for controlling advance of the wheel to obtain a desired sizing of the workpiece irrespective of decrease of the diameter of the wheel by wear.

In connection with the next preceding object, it is a specific object of the invention to provide a settable stop member which, in preparation of a grinding operation, is set to stop advance of the wheel in accordance with the existing diameters of the wheel and workpiece and is positionable thereafter in accordance with wear of the wheel and workpiece.

A further object of the invention is to automatically control the workpiece size in response both to advance of the grinding wheel to the workpiece and to decrease in the diameter of the wheel by wear.

Other objects of the invention will become apparent from the following detail description, taken in connection with the accompanying drawing, in which.

Figure 1:
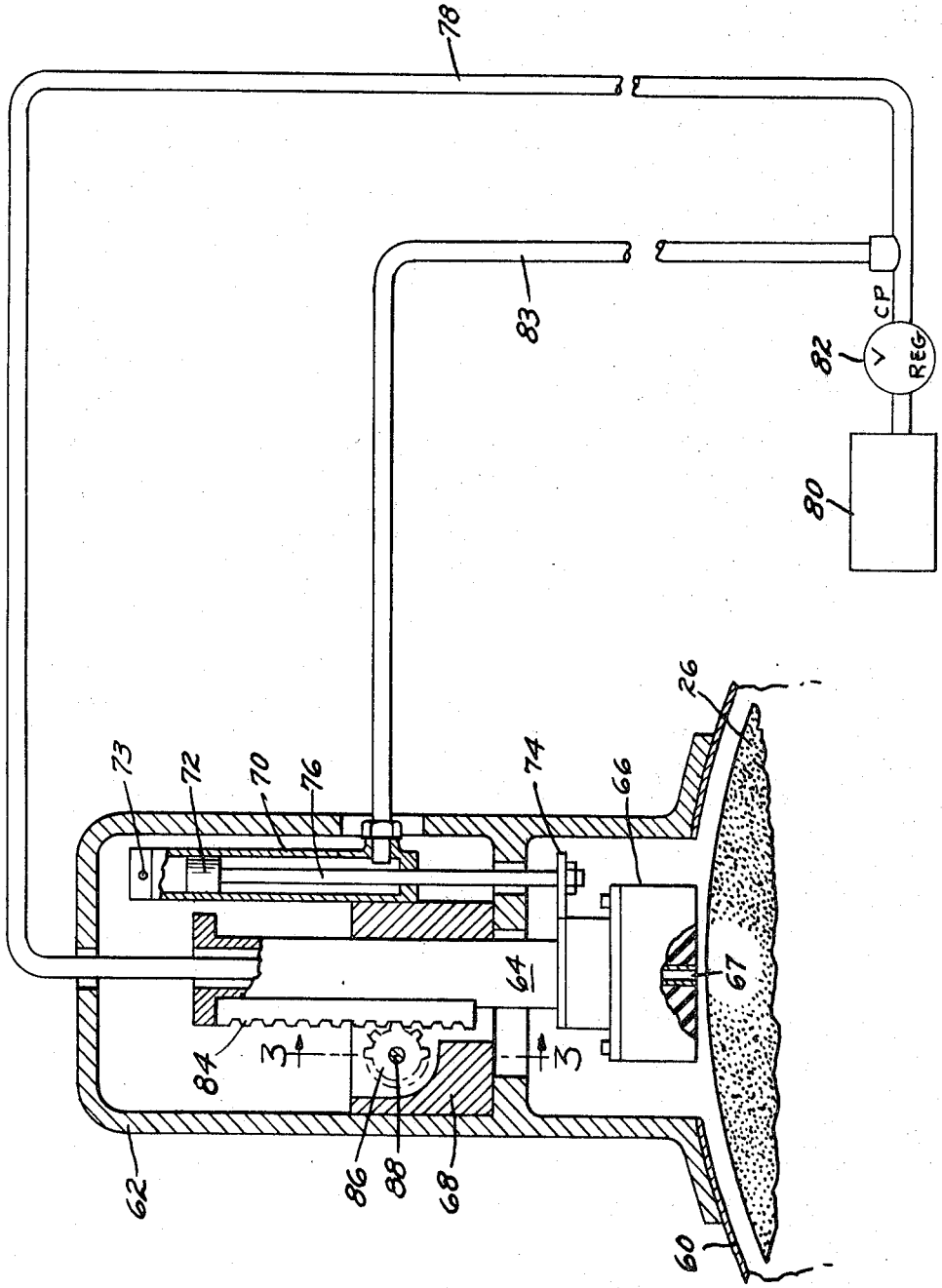
FIG. 1 is a view partly broken away and in section and partly diagrammatic of a control system for a grinding machine.

Referring to the drawing by characters of reference, the grinding machine comprises, in general, a base 20, a movable table 22, a workpiece drive mechanism 24 and a grinding wheel 26. The workpiece drive mechanism 24 is mounted on the base 20 at the front of the machine, and the grinding wheel 26 is mounted on the table 22 for movement against a metal workpiece 25, mounted for rotation about a horizontal axis. Also mounted on the table 22 there is an electric motor 28 for rotatably driving the grinding wheel 26 through a suitable drive connection, such as a belt drive 29.

Figure 2:
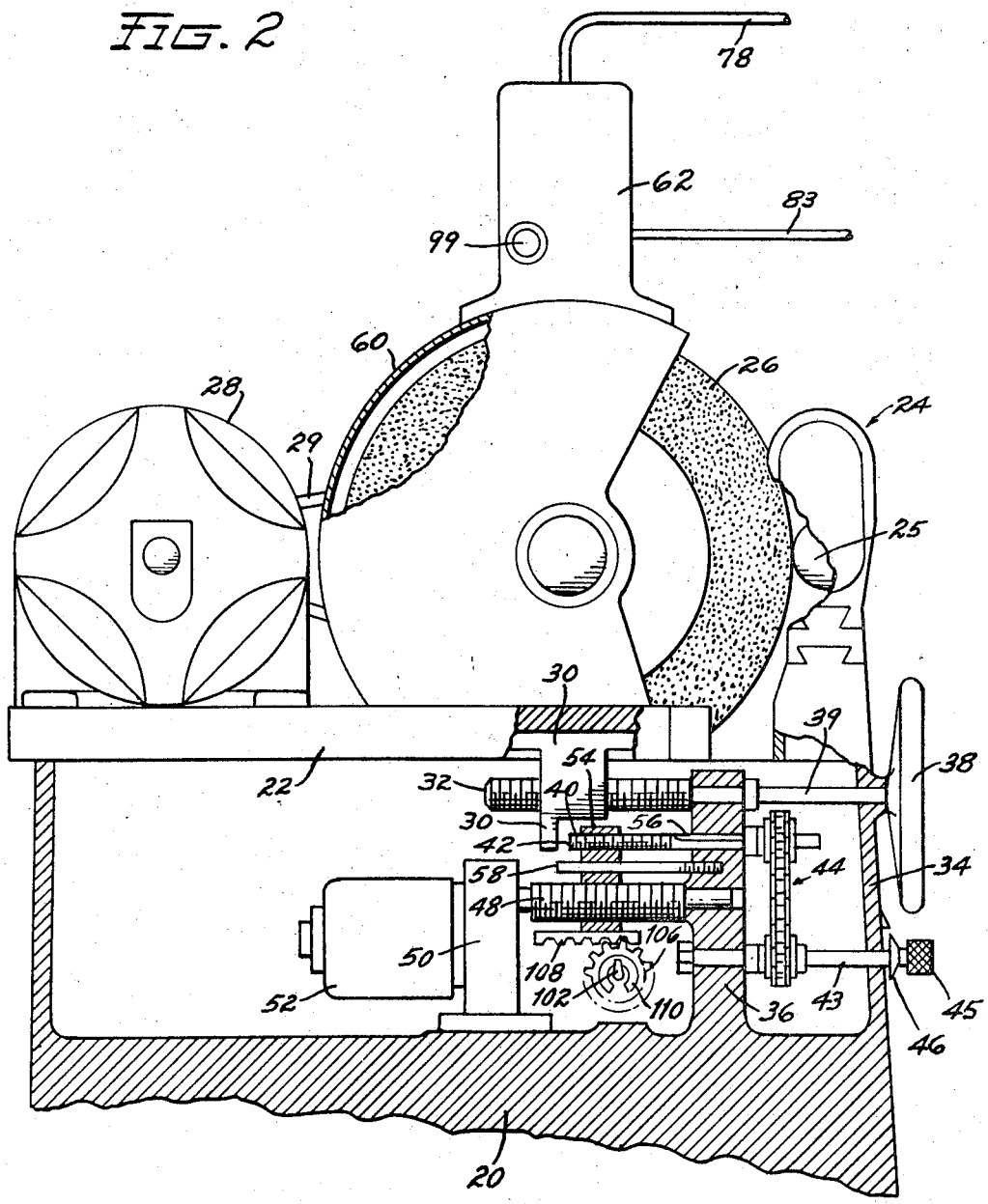
FIG. 2 is a side view partly broken away and in section of a grinding machine and control system therefor.
Figure 3:
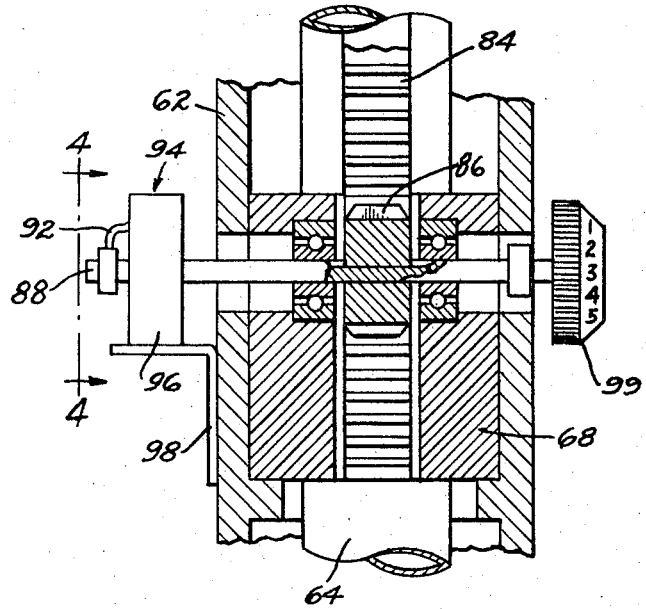
FIG. 3 is an enlarged vertical sectional view, taken along the line 3—3 of FIG. 1.
Figure 4:
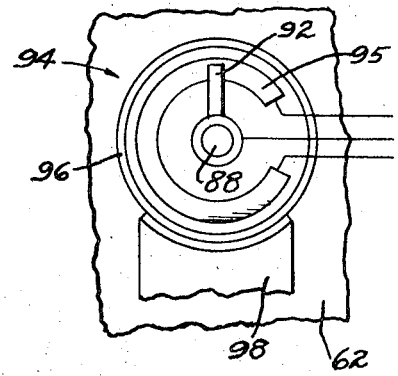
FIG. 4 is a fragmentary elevational view, taken in the direction of the arrows 4—4 of FIG. 3.

The table 22 is slidably supported and guided on the base 20 and has secured to the underside thereof a depending lug 30 which is internally threaded to receive a feed means or horizontal screw 32 to move the grinding wheel to the workpiece 25. As shown in FIG. 2, the feed screw 32 is journaled for rotation in front wall 34 and in an upstanding abutment 36 within the base. A hand wheel 38 is affixed to the outer end of a shank 39 of the screw 32 for manually moving the wheel 26 toward and/or away from the workpiece 25. It will be understood by those skilled in the grinder art that the grinding wheel 26 could be advanced against the workpiece 25 by any other suitable well known means such as the conventional hydraulic feed means.

Below the feed screw 32 there is a settable stop member 40 in the form of a screw which is parallel with the feed screw 32. One end 42 of the settable stop member is positioned in the path of the lug 30. The settable stop member 40 may be set by a machine attendant to stop the advance of the grinding wheel 26 when the workpiece 25 has been ground to the desired size. The mechanism for setting the stop member 40 may comprise a rotatable shaft 43, parallel with the stop screw 40 and journaled for rotation in the base 20. The shaft 43 is connected to the settable stop screw 40 by a sprocket and chain drive connection, designated generally by the reference character 44. Projecting forwardly of the base 20, and end portion of the shaft 43 has a hand knob 45 affixed thereto to rotate the shaft for setting the stop screw 40 at the desired position. A dial 46 on the shaft 43 may be suitably calibrated to indicate any desired setting of the stop screw 40. Further, the settable stop screw 40 is resettable by another feed means or screw 48 which is below the parallel to the stop screw 40. At one end thereof, the screw 48 has a shank journaled in the abutment 36 and at the other end has a similar shank within a housing 50 of a speed reduction mechanism for a reversible electric drive motor 52. Threaded onto the screw 48 there is a traveler or nut 54 into which the settable stop screw 40 is also threaded. The settable stop screw 40 is movable axially with the nut 54 by and when the motor 52 is energized, the purpose being to reset the stop screw 40 to compensate for decrease in diameter of the grinding wheel 26, as the wheel wears. In order that the settable stop screw 40 may be caused to move axially by rotation of the feed screw 48, the stop screw 40 is provided with a keyway 56 to receive a key (not shown) on the upper sprocket of the sprocket chain drive connection 44. The numeral 58 designates a stationary guide rod along which the nut 54 slides.

Supporting the grinding wheel 26 is the conventional mounting 60 which also functions as a guard, and rigidly mounted on the web of the guard there is a housing 62. Within the housing 62 there is a weight member in the form of a vertical sleeve 64 having a head 66 affixed to the lower end thereof, as shown in FIG. 1. The sleeve 64 extends through and is freely slidably guided by a body or block 68 which is secured to and within the housing 62. Within the housing 62 and rigidly secured to the block 68 is a cylinder 70 of a fluid pressure system, the cylinder containing a pressure responsive control member or piston 72. The cylinder 70 is provided in its upper end with the conventional port or air bleed 73. A laterally extending arm 74, secured to the head 66, is connected by a connecting rod 76 to the piston such that the piston and the weight member move together in parallelism.

A fluid conducting tube 78 extends down through the sleeve 64 and through the head 66 providing a downwardly directed outlet 67 to direct fluid pressure against the periphery of the grinding wheel 26. The other end of the tube 78 is connected to an air compressor 80 and adjacent the outlet of the compressor a constant air pressure regulator 82 is connected in the tube 78. The tube is affixed to the weight member and may be flexible such that they may move downwardly together. Another tube 83 communicatively connects to the tube 78 and to the interior of the cylinder 70 below the piston 72. It will now be understood that the air pressure system functions as a counterbalance for the weight member which as mentioned includes the tube 64 and head 66 to maintain the latter at a predetermined distance from the periphery of the wheel 26 as the diameter of the wheel decreases with wear.

Carried by the sleeve 64 there is a vertical gear rack 84 secured thereto and meshing with a pinion 86 which is affixed onto a shaft 88 journaled in the block 68. One end of the shaft 88 extends externally of the housing 62 and affixed to this end of the shaft there is a contact arm 92 of a rheostat 94. The arm 92 contacts an arcuate resistor member 95 secured to a holder 96 which in turn is rigidly mounted on the housing 62 by a bracket 98. Thus, the rheostat arm 92 responds to downward movement of the weight member which is a function of the decreasing diameter of the grinding wheel 26 during a grinding operation. A knob 99 is provided on the shaft 88 for conveniently setting the rheostat arm 92.

Figure 5:
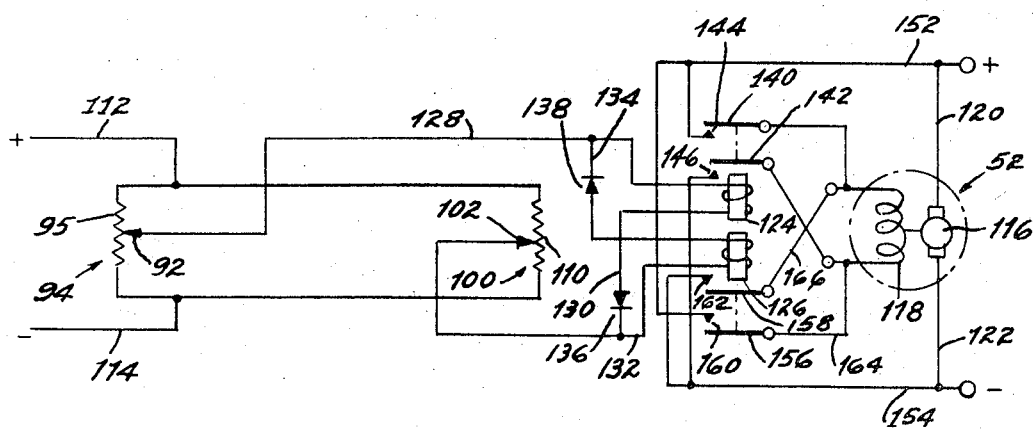
FIG. 5 is a diagrammatic illustration of a control system.

In order to compensate for decrease in the diameter of the grinding wheel 26 with respect to the preset position of the part size stop member 42, we provide for controlling the motor 52 by the rheostat 94 and a potentiometer 100 whereby to effect a continuous resetting of the stop member until grinding is completed. As previously mentioned the rheostat arm 92 is rotated in contact with the resistor 95 by the weight member which includes the sleeve 64 and head 66, the arm 92 rotating in a direction to increase voltage to the reversible motor 52 to move the stop member 42 forwardly. The potentiometer 100 has a movable contact member or arm 102 and as shown in FIG. 2, the arm 102 is affixed onto a rotatable shaft which is driven by a pinion 106 in mesh with a gear rack 108 carried by the nut 54. The arm 102 engages an arcuate resistor 110. The input circuits of the rheostat 94 and the potentiometer 100 are connected in parallel with a D.C. source of voltage, by lead lines 112 and 114, as illustrated in FIG. 5. The motor 52 is diagrammatically represented in FIG. 5 as comprising an armature 116 and a field or coil 118, the armature being connected by lead lines 120 and 122 to a source of electric power. Operatively connecting the motor coil 118, the rheostat 94 and the potentiometer 100 there is a pair of relays 124 and 126 respectively. One end of the coil of relay 124 is connected by a lead line 128 to the movable contact member 92 of the rheostat 94, and the other end of the coil of relay 124 is connected by a lead line 130 to the movable contact member 102 of the potentiometer 100. Similarly, the coil of the relay 126 has one end connected by a lead line 132 to the movable contact member 102 of the potentiometer 100, and its other end connected by a lead line 134 to the lead line 128 and thus to rheostat contact 92. In the lead lines 130 and 134 are respectively provided rectifiers or diodes 136 and 138 to effect unidirectional current flow in the desired direction. The relay 124 has a pair of connected together movable contact members 140 and 142 cooperable respectively with fixed contact members 144 and 146, connected by lead lines respectively to the positive lead 152 and the negative lead 154. Similarly, a pair of connected together movable contact members 156 and 158 of the relay 126 cooperate respectively with a pair of fixed contact members 160 and 162, connected respectively to the positive lead 152 and the negative lead 154. The movable contact members 156 and 158 are connected by leads 164 and 166 respectively to opposite ends of the coil 118 of the reversible motor 52. The closing of the contact members 140 and 142 causes the motor 52 to operate in a direction to move the settable stop members 42 forwardly or rightwardly, facing FIG. 2, and the closing of the contact members 156 and 158 causes the motor 52 to operate in a reverse direction to move the settable stop members 42 rearwardly.

OPERATION

At the start of a grinding operation, the machine attendant, by means of the knob 45 and dial 46, sets the stop members 42 as the desired part size setting. The attendant then, by means of the hand wheel 38 advances the grinding wheel 26 until the latter engages the work piece 25. At the start of the grinding operation, it will be understood that the rheostat contact member 92 and the potentiometer contact member 102 will be in like positions with respect to their resistors 95 and 110 such that no voltage is being applied to the coils of the relays 124 and 126. This, of course, means that both sets of the relay contacts 140, 142 and 156, 158 are open and therefore the motor 52 is at rest. As the machine attendant continues to advance the grinding wheel 26 against the workpiece 25, the diameter of the grinding wheel decreases by wear and the weight member moves downwardly under the control of the pressure responsive piston 72. As the weight member moves downwardly, the gear rack 84 in mesh with the pinion 86 rotates the shaft 88 and thus rotates the rheostat arm 92. When the rheostat arm 92 has been rotated along its resistor 95 to a point where the voltages applied to the coils of the relays 124 and 126 are unbalanced by a predetermined voltage differential, the contact members 140 and 142 close and start the motor 52 which then operates to reset the stop member 42 in compensation for the wear of the grinding wheel 26. The circuit of the coil of relay 124 is from the positive lead 112 through the rheostat resistor 95, contact member 92, lead 128, the coil of relay 124, lead 130, diode 136, potentiometer contact member 102 and resistor 110 to negative lead 114. It will thus be seen that the voltage differential between the coils of the relays 124 and 126 is a function of grinding wheel wear and that the motor 52 responds to such differential to reset the stop member 42 accordingly. When the motor 52 is energized to reset the stop member 42, the gear rack 108 of FIG. 2 is moved forwardly or rightwardly by the motor which rotates the gear 108 and thus the contact arm 102 of the potentiometer 100. The contact arm 102 is rotated in a direction to increase voltage to the coil of the relay 126 and thus decrease the aforementioned voltage differential between the relay 124 and 126. When the voltage differential becomes zero, the contacts 140 and 142 open to stop the motor 52. When the rheostat 94 is operated in response to wear of the grinding wheel 26, a positive voltage is produced through the rectifier 138 which energizes the coil of relay 126, closes relay contacts 156 and 158 and through leads 164 and 166 energizes the motor 52. Motor 52, through speed reducer 50 turns the screw 48 which advances the nut 54 whereupon the gear rack 108 rotates the gear 126 and consequently rotates the potentiometer arm 102. The arm 102 is rotated until the voltage at the potentiometer 100 is equal to the voltage at the rheostat 94 whereupon the motor 52 is stopped.

When a new grinding wheel is to be provided, the weight member must be moved upwardly and this causes the current to flow in the reverse direction through the coil of relay 124. As a consequence, the motor 52 will drive the screw 48 in a reverse direction which will move the stop member 42 leftward, as viewed in FIG. 2 and will also turn back the dial 46. In addition, the potentiometer arm 102 will be turned back until the voltages at the rheostat 94 and at the potentiometer are in balance whereupon the motor 52 is stopped.

Figure 6:
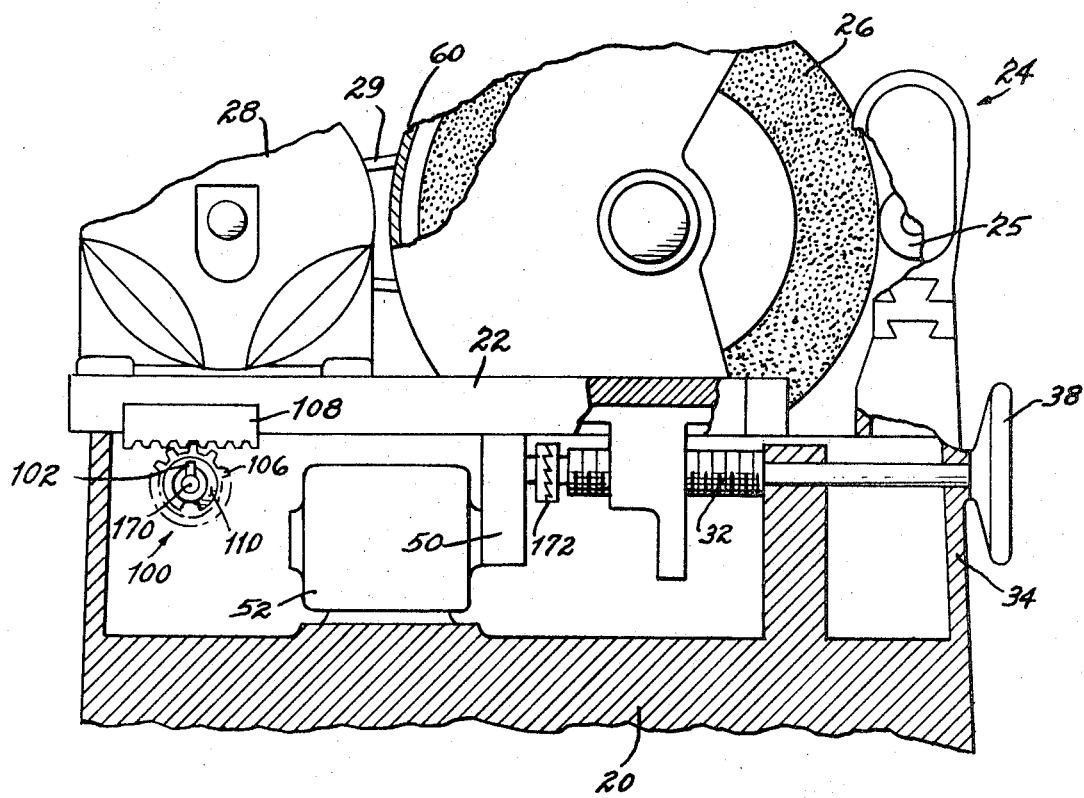
FIG. 6 is a view similar to FIG. 2 of a modification.

Referring now to FIG. 6 there is shown a modification of the part size control system of FIG. 2 and like parts have been designated by like reference characters to avoid unnecessary repetitious description. In the modification, the feed member or screw 32 is driven by the motor 52 through the speed reduction mechanism 50 to feed the grinding wheel 26 against the part or workpiece 25. Preparatory to the grinding of the workpiece 25, the machine attendant, by means of the hand wheel 38 advances the grinding wheel 26 until it is tight against a finished size workpiece. The attendant then turns the potentiometer contact 102 by a knob 170 until the potentiometer is in phase with the rheostat 92 whereby relay contacts 140 and 142 are open and motor 52 is at rest.

By means of the hand wheel 38, the machine attendant moves the grinding wheel 26 away from the workpiece 25. During this time a unidirectional clutch 172 which connects the speed reduction mechanism 50 to the screw 32 will be turning in a direction to feed the grinding wheel into the workpiece 25, but cannot do so until the attendant stops turning the screw 32. With a new unground workpiece 25 in place, the motor 52, through speed reducer 50 drives the unidirectional clutch 172 and screw 32 forwardly until the potentiometer 100 is in phase with rheostat 94. At this time, the relay contacts 140 and 142 will open to stop advance of the grinding wheel and the workpiece 25 will have been ground to size. Wheel wear will have been compensated for as previously described in connection with the workpiece size control mechanism of FIG. 2. From the above description of the modification, it will now be understood that the potentiometer contact arm 102 functions as a settable stop member for stopping the motor 52, and determines the size to which the workpiece is finished ground.

What is claimed is:

1. In abrading apparatus for grinding a workpiece to size, supporting means, a driven grinding wheel movable on said supporting means against a workpiece, said grinding wheel decreasing in diameter by wear, means operable to advance said grinding wheel against the workpiece, a control member operatively connected to said operable means to control the latter and responsive to wear of said grinding wheel and also responsive to the advance of said wheel.

2. In abrading apparatus as defined by claim 1 wherein said control member effects advance of said grinding wheel in response to decrease in the diameter of the latter and stops advance of said grinding wheel in response to predetermined advance of said grinding wheel.

3. In abrading apparatus as defined by claim 1 with the addition of a presettable stop member movable with said grinding wheel and resettable by said control member in response to decrease in diameter of said grinding wheel.

4. In abrading apparatus for grinding a workpiece to size, supporting means, a driven grinding wheel movable on said supporting means against a workpiece, said grinding wheel decreasable in diameter by wear, movably mounted means movable in response to decrease in diameter of the wheel, a feed member operable to advance said wheel against the workpiece, a settable stop member to stop advance of said wheel to determine the finished size of the part, an electric motor operatively connected to one of said members to move said one member, a first switch member operable to start said motor in response to predetermined movement of said movable member to compensate for wheel wear, and a second switch member to stop said motor in response to an advance of said wheel corresponding to said predetermined movement.

5. In abrading apparatus as defined by claim 4 in which said motor operates to reset the settable stop member.

6. In abrading apparatus as defined by claim 4 in which said motor drives the feed means.

References Cited
UNITED STATES PATENTS

| | | | |
|---|---|---|---|
| 1,549,600 | 8/1925 | Mueller | 51—165 |
| 3,090,171 | 5/1963 | Stimson | 51—165 |
| 3,137,103 | 6/1964 | Stade et al. | 51—165 |

FOREIGN PATENTS

| | | |
|---|---|---|
| 481,021 | 2/1938 | Great Britain. |

LESTER M. SWINGLE, Primary Examiner